UNITED STATES PATENT OFFICE.

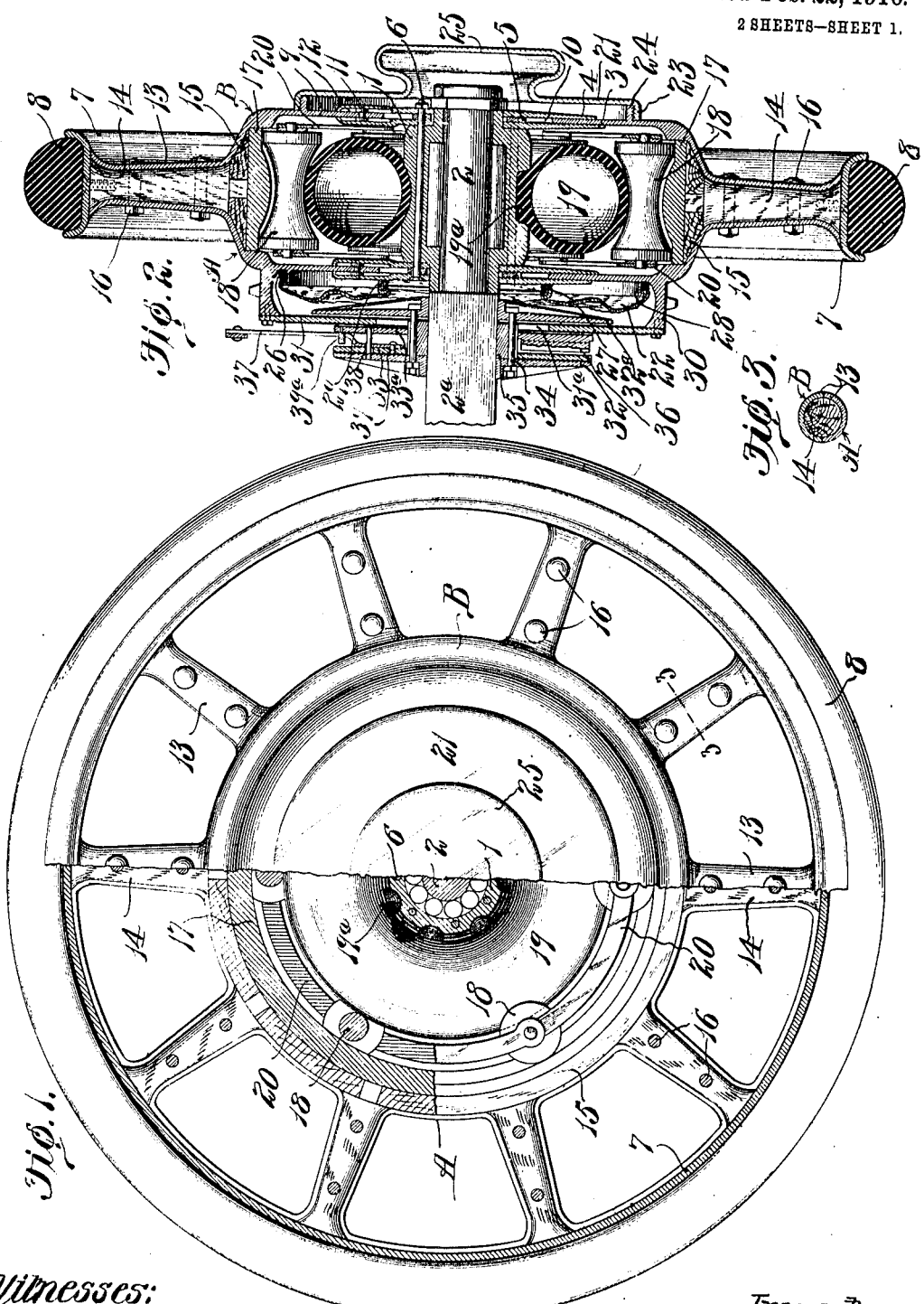

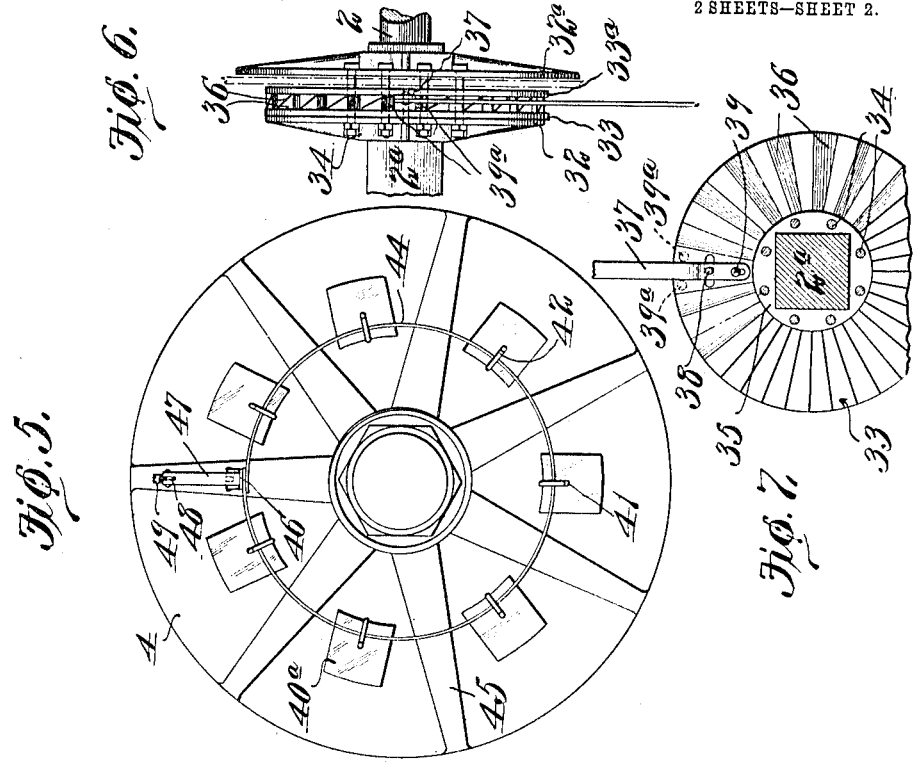

NICHOLAS SCHENK, OF ST. LOUIS, MISSOURI.

VEHICLE-WHEEL.

950,407.

Specification of Letters Patent. Patented Feb. 22, 1910.

Application filed May 3, 1907. Serial No. 371,716.

*To all whom it may concern:*

Be it known that I, NICHOLAS SCHENK, a citizen of the United States, residing at St. Louis, Missouri, have invented a certain new and useful Improvement in Vehicle-Wheels, of which the following is a full, clear, and exact description, such as will enable others skilled in the art to which it appertains to make and use the same, reference being had to the accompanying drawings, forming part of this specification, in which—

Figure 1 is a side elevation of a wheel constructed in accordance with my invention, some of the parts being broken away to more clearly show the construction of the wheel; Fig. 2 is a cross sectional view of the wheel shown in Fig. 1; Fig. 3 is a detail sectional view taken on the line 3—3 of Fig. 1; Fig. 4 is an enlarged cross sectional view of a portion of the wheel showing the mechanism that is employed for holding the two sections of the wheel in their normal positions when the pneumatic cushion becomes deflated; Fig. 5 is a side elevational view of parts of the mechanism shown in Fig. 4; Fig. 6 is a detail top plan view of the brake shown in operative position in Fig. 2; and Fig. 7 is a detail view of one of the expansion plates of the brake.

This invention relates to vehicle wheels, and particularly to that type which comprise a hub section and a rim section adapted to move relatively to each other in a vertical plane and having a pneumatic cushion arranged between said sections to absorb the shocks or jars which the rim section receives as it passes over obstructions in the road.

The main object of my invention is to provide a wheel of the character described which presents a neat and ornamental appearance and which is absolutely dust and water proof.

Another object of my invention is to provide a wheel that is light and strong and which can be manufactured at a small cost.

Another object is to provide a wheel of the character described which is provided with means for enabling the wheel to be used even after the pneumatic cushion therein has become deflated. And still another object of my invention is to provide a wheel comprising a rim section and a hub section adapted to move relatively to each other in a vertical plane, an inflated cushion arranged between the hub section and rim section, and a plurality of devices separated from each other and interposed between the pneumatic cushion and the rim section so that said cushion will not bear throughout its entire surface upon both of said sections, thereby enabling said cushion to absorb the shocks or jars to which the rim section is subjected as it passes over obstructions in the road.

Other desirable features of my invention will be hereinafter pointed out.

Referring to Figs. 1 and 2 of the drawings which illustrate the preferred form of my invention, 1 designates the hub of the wheel provided with roller bearers that travel on the axle 2. Said hub has its outer ends reduced, and mounted on these reduced portions of the hub are pairs of plates 3 and 4, the plates of each pair being held spaced apart by means of a filler 5 and being rigidly connected to the hub, preferably by means of bolts 6 that extend through the central enlarged portion of the hub, as shown clearly in Fig. 3.

The rim section of the wheel comprises an inside metallic member A and an outside member B which support a metallic rim 7 in which a rubber tread 8 is mounted. The central portions 9 of these side members A and B are telescoped between the pairs of plates 3 and 4 of the hub section so that the hub and rim sections will be held in vertical alinement with each other, said side members being provided at their centers with openings 10 that permit the hub and rim sections to move relatively to each other in a vertical plane. For transmitting rotary movement from one section to the other I have provided each of the side members A and B with a pair of rolls 11 that operate in elongated depressions 12 formed in the pairs of plates 3 and 4 of the hub section, said rollers being mounted on pins that are carried by the central portions 9 of the side members, as shown in Fig. 2.

I do not wish it to be understood that my invention is limited to the construction herein shown for transmitting rotary movement from one section to the other as various means could be employed for accomplishing this result.

The side members A and B comprise spoke portions 13 which are approximately semicircular in cross section, as shown in Fig. 3, said spoke portions embracing wooden spokes 14 that project radially from a felly 15 preferably formed of wood and arranged between the side members of the rim section. The side members are connected by means of bolts 16 or other suitable fastening devices that extend through the spoke portions 13 and also through the wooden spokes, the metallic rim 7 being preferably secured to the outer ends of said spokes by means of screws or other fastening devices. A metallic ring or tread 17 is preferably arranged inside of the wooden felly and forms a track for a plurality of bearing members 18 that rest upon the outer surface of a pneumatic cushion 19 which surrounds the hub 1, means being provided for preventing said cushion from creeping on the hub. The means herein shown consists of projections $19^a$ on the cushion which project into recesses in the periphery of the hub but it will, of course, be understood that this could be accomplished in numerous ways.

As shown in Fig. 1, the bearing members 18 are separated or arranged quite a distance from each other and are connected together by links 20 so that the rim section only bears at a few points upon the pneumatic cushion, thereby enabling said cushion to more readily take up or absorb the shocks and jars of the rim section than if the cushion was snugly embraced by the rim section. The bearing members 18 herein shown consist of concaved rollers but if desired other forms of rollers could be used or, in fact, any suitable devices that would hold the rim section out of contact with the cushion.

For preventing dirt, water or any other foreign substance from entering the joints between the telescoping plates of the rim and hub sections I have provided the outside member B of the rim section with a removable cap 21 that extends completely over the central portion 9 of said member and the inside member A with a flexible cover 22 that is connected at its outer edge to the side member A and at its inner edge to the outside plate 4 of the hub section, said cover being approximately the same shape as a washer. The outside cap 21 is formed in one piece and is provided at its edge with an inwardly projecting flange 23 that is screw-threaded and engages coöperating screw-threads on a laterally projecting circular flange 24 on the central portion of the side member B. At the center of the cap is a knob 25 which enables the cap to be turned and also presents a finished appearance to the wheel. The flexible cover 22 on the inner side of the wheel is preferably made of oiled silk or some other suitable water-proof material. The inner and outer edges of the piece of material which forms the cover 22 are connected to split rings 26 and 27, the outer ring being in the form of a contraction spring and the inner ring in the form of an expansion spring. The outer ring 26 fits over a laterally projecting L-shaped flange 28 on the central portion of the side member A, and the inner ring 27 fits inside of an L-shaped flange 29 on the plate 4 of the hub section. The tension of these rings will retain said cover in position but to absolutely prevent accidental displacement of same I prefer to use auxiliary spring rings $26^a$ and $27^a$. With a construction of this character it will be absolutely impossible for dirt or water to get into the interior of the wheel as the joints between the telescoping plates of the rim and hub sections are protected by covers or caps of greater diameter than the plates 3 and 4 of the hub section. The wheel is practically water-tight and if desired the interior of the wheel can be filled with graphite or some other suitable lubricant that will keep the sliding parts of the wheel thoroughly lubricated. Furthermore, the cap 21 hides the hub section of the wheel from view so that in appearance the wheel is substantially the same as the usual automobile wheel.

The wheel herein shown is adapted to be used on a vehicle employing a "wheel drive" instead of an "axle drive" so that the side member A is provided with a sprocket wheel 30 over which the driving chain passes. It will be obvious, however, that this same construction could be embodied in a wheel to be used on a vehicle employing an "axle drive," the only substantial difference being that the hub would be secured directly to the axle instead of being rotatably mounted thereon.

The wheel herein shown is provided with a "brake" that I think is of novel construction and which consists of a plate 31 secured to the outside face of the sprocket wheel 30 and adapted to be clamped between members on the axle hereinafter described, said plate being provided at its center with an opening $31^a$ to provide for the relative vertical movement of the hub and rim sections. The members on the axle which clamp the brake plate 31 consist of two disks 32 and $32^a$, having square openings which fit over the square portion $2^a$ of the axle so that said disks can move longitudinally of the axle but are prevented from rotating relatively thereto, and also two expansion plates 33, $33^a$, interposed between the outside disk 32 and the brake plate 31, the inside disk $32^a$ being arranged on the inner side of the brake plate, as shown in Figs. 2 and 6. Said disks are provided on their outer faces with strengthening ribs and are connected together by bolts 34 which extend through a spacing member 35 mounted on the squared portion of the shaft and provided with a circular periphery. The expansion plates are rotatably mounted on said spacing member and are provided on their inner faces with coöperating oppositely inclined projections 36, as shown more clearly in Fig. 6. Rotary movement in opposite directions is imparted to these expansion plates so as to cause the inclined projections 36 to ride upon each other and thus force the plates apart, by means of a manually operated lever 37, pivotally mounted on a pin 38 projecting inwardly from the outer disk 32 and connected at its lower end by a pin 39 to one of the expansion plates and by means of pins 39ª to the other expansion plate, the lever passing between the pins 39ª, and the expansion plates being provided with elongated slots to receive the pivot pin 38, as shown in Fig. 7. When the expansion plates are forced apart by actuating the lever 37 the brake plate 31 will be firmly clamped between the inside disk 32ª and the inside expansion plate 33ª so that the wheel will come to rest. Preferably, the brake plate is provided with friction faces of any suitable material and the coöperating members are also provided with friction faces.

In Figs. 4 and 5 I have shown my improved wheel provided with mechanism that enables the wheel to be used even after the pneumatic cushion has become punctured so that in case of such an accident while out on the road the journey can be completed without damaging any of the parts of the wheel.

As shown in Fig. 4, the inside plate 3 of one pair of plates of the hub section and the outside plate 4 of the other pair are provided with a plurality of openings which receive blocks 40 and 40ª, respectively, of greater thickness than said plates. The blocks 40ª at the outer side of the wheel are provided with L-shaped devices 41 and the blocks 40 at the inner side of the wheel are secured to rods 42 that extend through the hub 1 and are provided at their outer ends with heads that extend over the heads of the devices 41 on the outside blocks 40ª. Each of said rods 42 is surrounded by a coiled expansion spring 43 that is interposed between the hub and the inside block 40 to which the inner end of the rod is connected. A split band spring 44 which lies against ribs 45 on the outside face of the plate 4 extends underneath the heads of the devices 41 of all of the blocks 40ª and thus holds said blocks and the inside blocks 40 in their normal positions out of the vertical planes in which the portions 9 of the rim section lie, thereby permitting said portions to slide between the pairs of plates 3 and 4 of the hub section without coming in contact with said blocks. The band spring 44 is retained in operative position by means of a pivoted device 46 carried by the outside plate 4 and extending over the lapped ends of the band spring, said device being pressed down upon the band spring by means of a link 47 connected to the outer end of a lever 48 secured to the plate 4 and acted upon by a leaf-spring 49.

A rod 50 which is connected to the inner end of the lever 48 lies in a slot in the plate 4 and the inner end of said rod projects into the opening between the pair of plates 3 and 4 at a point adjacent the hub, as shown in Fig. 4.

The operation of this mechanism is as follows: In case the pneumatic tube should become deflated the hub section will drop down onto the rim section and thus cause the portion 9 of the side member B to engage the inner end of the rod 50 when it comes around to the lower side of the wheel and thus actuate the lever 48, thereby elevating the link 47 so that the pressure on the lapped ends of the spring band 44 is removed. Said spring band will then fly off the devices 41 of the outer blocks 40ª and the expansion springs 43 will then force the inner blocks 40 and also the outer blocks 40ª into the paths of movement of the portions 9 of the rim section and thus rigidly support the rim section, said blocks corresponding in depth to the distance between the edges of the central openings in the portions 9 and the fillers 5 that are interposed between the pairs of plates 3 and 4.

Having thus described my invention, what I claim as new and desire to secure by Letters Patent is:

1. A wheel comprising a hub section, a rim section, telescoping members on said respective sections, means for preventing relative rotating movement of said sections, a single pneumatic cushion arranged between the hub section and rim section and mounted on the hub section, a ring-shaped track or tread secured to the rim section and spaced away from said cushion, roller bearings interposed between said ring and said cushion, and means for holding said bearings in a predetermined position; substantially as described.

2. A wheel comprising a hub having its end portions reduced, a pair of plates spaced away from each other and rigidly connected to each of the reduced end portions of the hub, a rim section provided with two independent portions each of which telescopes between a pair of said plates, means for preventing relative rotating movement of the rim section and hub, a pneumatic cushion mounted on the hub, a metallic ring-shaped track surrounding said cushion and spaced away therefrom, roller bearings interposed between said track and cushion, and links connecting said bearings together; substantially as described.

3. A wheel comprising a hub section provided with two pairs of plates, a rim section consisting of metallic side members having portions which telescope between the plates of said pairs, spoke portions, a metallic rim in which a tread is mounted and a ring-shaped track clamped between the side members, a pneumatic cushion surrounding the hub and having its outer surface spaced away from the track of the rim section, and bearing members interposed between said cushion and said track; substantially as described.

4. A wheel of the character described, provided with a rim section consisting of two metallic side members provided with spoke portions, a felly separate and distinct from said side members and provided with wooden spokes that are incased by the spoke portions of the side members and rigidly connected thereto, and a metallic flange secured to the outer ends of said spokes; substantially as described.

5. In a wheel of the character described, a hub section provided adjacent its ends with pairs of plates, a rim section comprising side members that telescope with said plates, a pneumatic cushion arranged between said hub section and rim section, a laterally projecting flange formed on one of the side members of the rim section, a laterally projecting flange formed on one of the plates of the hub section, a flexible cover of approximately washer shape provided at its inner and outer edges with split rings that engage said flanges to retain the cover in position, and a cap provided with a screw-threaded flange that engages a screw-threaded flange on one of the side members of the rim section; substantially as described.

6. A wheel of the character described, comprising a hub section provided with pairs of plates, a rim section having members which telescope within said plates, a pneumatic cushion arranged between said hub and rim section, and automatically operated mechanism which moves into position between the hub and rim sections when the pneumatic cushion becomes deflated; substantially as described.

7. A wheel of the character described, comprising a hub section provided with pairs of plates, a rim section having portions which are in telescopic engagement with said plates, a pneumatic cushion arranged between said hub and rim sections, movable blocks permanently connected to the hub section, and automatic means for forcing said blocks into position to support the telescopic portions of the rim section when the pneumatic cushion becomes deflated; substantially as described.

8. A wheel comprising a hub provided with pairs of plates, a rim section comprising side members which are telescoped between said pairs of plates and are provided with central openings to permit the hub and rim sections to move relatively to each other in a vertical plane, a pneumatic cushion arranged between the hub and rim sections, a plurality of blocks carried by the pairs of plates of the hub section, devices projecting laterally from said blocks, a spring band engaging said devices to hold said blocks normally in inoperative position, means for releasing said spring band when the pneumatic cushion becomes deflated, and means for forcing said blocks into engagement with the side members of the rim section to rigidly support same; substantially as described.

9. A wheel comprising a hub section provided with pairs of plates, a rim section provided with side members which are telescoped between said plates, a pneumatic cushion arranged between the hub section and rim section, a plurality of blocks mounted in the pairs of plates of the hub sections of each side of the wheel, devices connected to the blocks at one side of the wheel, a spring band engaging said devices and having its ends lapped, a device for exerting pressure on the lapped ends of said band, means for actuating said device when the pneumatic cushion becomes deflated so that said spring band can move out of engagement with the devices on the blocks, and means for moving the sets of blocks at each side of the wheel into engagement with the side members of the rim section to rigidly support same; substantially as described.

10. In a wheel of the character described, a hub provided adjacent its ends with pairs of plates, a rim section having side members which are interposed between said plates, a pneumatic cushion arranged between the hub section and rim section, a plurality of blocks carried by each pair of plates on the hub, a rod connected to each block on one side of the wheel and passing through the hub to the blocks at the other side of the wheel, means for holding said blocks normally in inoperative position, and means for forcing said blocks into engagement with the side members of the rim section to rigidly support same when the pneumatic cushion becomes deflated; substantially as described.

11. A wheel comprising a hub section, a rim section, a single pneumatic cushion arranged between said sections, and a plurality of freely movable or shiftable bearing devices separated from each other and interposed between the pneumatic cushion and the rim section so that the rim section will rest directly on said devices and said devices will rest directly on the cushion; substantially as described.

12. In a wheel, a rim section, a hub section, a single pneumatic cushion arranged between said sections and mounted on the hub section, a plurality of separated bearing devices interposed between said cushion and said rim section and resting upon said cushion, and means for connecting said bearing devices together so that all of them can shift or move simultaneously relatively to the hub and rim sections and to the cushion upon which they rest; substantially as described.

13. A driving vehicle wheel comprising a hub section, a rim section, means to prevent the relative sidewise movement of the sections, a pneumatic cushion arranged between the sections, and automatically operating mechanism which moves into position between the sections when the pneumatic cushion becomes deflated during rotation of the wheel under load.

In testimony whereof I hereunto affix my signature in the presence of two witnesses, this thirtieth day of April 1907.

NICHOLAS SCHENK.

Witnesses:
WELLS L. CHURCH,
GEORGE BAKEWELL.